(12) United States Patent
Dawson et al.

(10) Patent No.: US 7,177,399 B2
(45) Date of Patent: Feb. 13, 2007

(54) DETERMINING THE GEOGRAPHICAL LOCATION FROM WHICH AN EMERGENCY CALL ORIGINATES IN A PACKET-BASED COMMUNICATIONS NETWORK

(75) Inventors: Martin C Dawson, West Wollongong (AU); Mark Lewis, Aurora, IL (US); Maciej Broda, Ottawa (CA)

(73) Assignee: Nortel Network Limited, St. Laurent (CA)

(*) Notice: Subject to any disclaimer, the term of this patent is extended or adjusted under 35 U.S.C. 154(b) by 0 days.

(21) Appl. No.: 10/861,194

(22) Filed: Jun. 4, 2004

(65) Prior Publication Data

US 2005/0190892 A1 Sep. 1, 2005

Related U.S. Application Data

(60) Provisional application No. 60/548,746, filed on Feb. 27, 2004.

(51) Int. Cl.
*H04M 11/00* (2006.01)
(52) U.S. Cl. .................................. 379/45; 370/352
(58) Field of Classification Search ............ 379/37–51, 379/90.01; 370/259, 351, 352
See application file for complete search history.

(56) References Cited

U.S. PATENT DOCUMENTS

| | | | |
|---|---|---|---|
| 6,587,545 B1 | 7/2003 | Antonucci et al. | |
| 6,678,357 B2 * | 1/2004 | Stumer et al. | 379/45 |
| 6,707,888 B1 * | 3/2004 | Cope | 379/45 |
| 6,744,856 B2 * | 6/2004 | Karnik et al. | 379/45 |
| 6,940,950 B2 * | 9/2005 | Dickinson et al. | 379/45 |
| 2003/0086539 A1 * | 5/2003 | McCalmont et al. | 379/45 |
| 2003/0108175 A1 | 6/2003 | Poikselka et al. | |
| 2003/0227922 A1 | 12/2003 | Horvath et al. | |
| 2005/0063519 A1 * | 3/2005 | James | 379/45 |
| 2005/0169248 A1 * | 8/2005 | Truesdale et al. | 370/352 |

* cited by examiner

*Primary Examiner*—Stella Woo
(74) *Attorney, Agent, or Firm*—Barnes & Thornburg LLP

(57) ABSTRACT

In order that emergency service vehicles can be dispatched to the correct destination promptly, accurate information about the location of the caller is needed. Another problem concerns routing emergency calls to the correct destination. For emergency calls a universal code is used such as 911 in North America and 112 in Europe. This universal code cannot be used to identify the destination of the call. These problems are particularly acute for nomadic communications systems such as voice over internet protocol communications networks. That is because user terminals change network location. These problems are solved by enabling the geographical location of the emergency caller to be determined by entities within a packet-based network without the need for modification of existing emergency services network infrastructure.

10 Claims, 8 Drawing Sheets

DETERMINING THE GEOGRAPHICAL LOCATION FROM WHICH AN EMERGENCY CALL ORIGINATES IN A PACKET-BASED COMMUNICATIONS NETWORK

RELATED APPLICATION

This application is the non-provisional filing of provisional application No. 60/548,746, filed Feb. 27, 2004.

The present invention relates to a method and apparatus for determining the geographical location from which an emergency call originates in a packet-based communications network. The invention also relates to a method and apparatus for providing a routing key for routing an emergency call from a packet-based communications network node to an emergency services network node.

BACKGROUND TO THE INVENTION

There are a number of particular problems in dealing with emergency calls that do not arise for regular calls. For example, in order that emergency service vehicles or other assistance can be dispatched to the correct destination promptly, accurate information about the location of the caller is needed. Previously, in conventional switched telephone networks, it has been possible to provide the caller location information relatively easily because telephone handsets are typically fixed in particular locations. Static database entries can then be made in a database accessible to the emergency services associating for example, a subscribers' home address and telephone number. However, for mobile communication systems and also for nomadic systems use of such static database entries is not possible because the location of a communications terminal varies over time.

Another problem concerns routing emergency calls to the correct destination. For regular calls this is not such an issue because the caller enters specific details of the required call destination. However, for emergency calls a universal code is used such as 911 in North America and 112 in Europe. This universal code cannot be used to identify the destination of the call. Generally, an emergency call needs to be routed to a particular geographical answering point for servicing. This answering point is often referred to as a Public Safety Answering Point (PSAP). The jurisdiction for emergency services answering points is typically quite small, for example, at the county level in the USA. This information about the location of the caller is needed to determine which emergency services answering point to route the call to. Misrouting of calls to the wrong answering point leads to costs in transferring calls, impacts reliability, and leads to delays which are significant in life threatening situations. Previously, in conventional switched telephone networks, this location information was relatively easy to obtain because static database entries could be used as mentioned above. However, this is not possible for mobile and nomadic communications systems.

One proposal has been to update or refresh the database entries every 24 hours. However, this approach cannot cope with situations where a user terminal changes location more than once a day. Also, changes to the existing emergency services network infrastructure are required in order to enable the database to be updated daily.

More detail about how existing voice networks interface to the emergency services network is now given. The primary existing voice networks that do interface to emergency services are the PSTN (public switched telephone network) as served by LECs (local exchange carriers) and the various mobile networks operated by the cellular carriers.

The emergency services network, from this perspective, can be regarded as being made up of Selective Routers (SRs), Automatic Location Identification (ALI) databases, both local and national, and the Public Safety Answering Points (PSAPs) themselves with their various CAMA (centralized automatic message accounting), and other, trunk connections and various data connections for querying the ALIs. Of course, beyond these network elements are the public safety organisations themselves (Police, Fire, Ambulance) and the communications networks that support them.

The location of the subscriber, who is dialing emergency services, is used for two key purposes. The first is routing of the call, ultimately to the right PSAP, and the second is in the delivery of the location, for display, to the PSAP operator in order that emergency response units can be dispatched to the correct location.

In wireline voice networks, there is an association between the phone number of the subscriber (The Calling Line Identifier—CLID) and that subscriber's location. This is generally, the home address of the subscriber as maintained by their local exchange carrier. In this case, the CLID becomes a ready-reference to location.

Similarly, the incoming line to the local exchange switch and the switch itself provides an explicit indication of the appropriate routing of 911 calls. This permits the local exchange to work from a static configuration in terms of selecting the outgoing trunk on which to place the call so it goes to the correct selective router. The selective router, in turn, can use the same static association and CLID information to ensure that the call is routed to the correct serving PSAP for the subscriber's address.

In cellular systems, the association between the subscriber's location and their CLID is lost. Being, by definition, mobile a cellular subscriber can be anywhere within the wireless network's area of coverage. Similarly, there is no physical wired line corresponding to the source of the call from which to associate a route to the correct destination. In cellular networks, however, there is a physical serving cell from which the call is initiated. The geographic granularity of these cell locations is generally sufficiently fine for the mobile switch to determine the correct trunk route to a corresponding selective router. In many cases, this also provides sufficient accuracy for the selective router to determine which PSAP the caller should be connected with.

It is an internal procedure for the mobile switch to associate an outgoing trunk route with a serving cell. However, some signaling is required for an MSC (mobile switching center) to pass this same information along to the selective router so that it can determine the correct PSAP. The TR45 standard, J-STD-036 "Enhanced Wireless 9-1-1 Phase 2", Telecommunications Industry Association, 2000, defines mechanisms for doing this. The routing information is passed to the selective router in the ISUP (ISDN user part) call setup signaling in one or other newly defined parameters called the Emergency Services Routing Digits (ESRD) or the Emergency Services Routing Key (ESRK). The selective router examines the value of the ESRD/ESRK parameter in the call setup signaling and routes the call to the correct PSAP based on this value.

Note that there are circumstances where cell boundaries can span the boundaries of PSAP catchment areas. In this case, and ESRD or ESRK determined from a serving cell may not provide a reliable indication of a route to the correct PSAP. Both ANSI-41 (generally TDMA, and CDMA) and 3GPP (generally GSM, EDGE, and UMTS) cellular networks have identified functionality to address this. In ANSI-41 networks a functional element known as a Coordinate Routing Database (CRDB) is defined. The network can consult the CRDB and, based on the geographic location of the caller (determined by different positioning technologies such as forward link trilateration, pilot strength measurements, time of arrival measurements, etc.), it will return an appropriate value of the routing parameter. As long as the geographic location is an improvement in accuracy over the cell location, this mitigates the problem of misrouted calls. Similarly 3GPP networks allow the switch to request a refined routing key value from the Gateway Mobile Location Center (GMLC) based on the geographic location of the caller.

The second, independent, area in which location comes into play in E911 calling is the display of the caller's location to the PSAP operator. The need for this is that the PSAP operator can facilitate more rapid despatch of the emergency service response units if the network can deliver the location rather than relying on getting this information from the caller—particularly where the caller may be unable to provide this information.

In a wireline voice network, necessary subscriber (or, at least, calling line) address information is stored in a database known as an Automatic Location Identification, or ALI, database. On receipt of an emergency call and, armed with the caller's CLID, the PSAP is able to query this database and receive, in return, the street address (also known as a civic address) information associated with the CLID. The physical interface over which the PSAP makes this query is variable. It may be an IP based interface over dial-up or broadband or it may be made over an X.25 packet interface. Similarly, the ALI may physically be co-located within the LEC and selective router, or it may be a remote national ALI handling the request directly or in tandem from the local ALI. Similarly, the protocol may vary but one known as PAM (PSAP to ALI message specification) is in common usage. These details are contained within the emergency network itself and not generally a concern of the larger voice network on the far side of the selective router.

In a cellular network, the same level of detachment with respect to this function is not possible. To begin with, the location of the caller is variable both initially and during the period of an emergency call. It is no longer possible to rely on a static database of location information that can provide an address against a CLID. It now becomes necessary for the PSAP to be able to request a dynamic location both for the initial position of the caller but also for any changes during the call. In addition, a civic address may no longer be pertinent to the location of the caller. By nature, cellular networks cover wide and varying types of territory. A conventional street address may no longer apply to a caller's location. Indeed, they may not even be in or by a street as the term is commonly understood. For this reason, a more universal reference system for location needs to be used. The solution generally adopted and, once more defined in J-STD-036 as referenced above, is to use geospatial co-ordinates—or latitude and longitude—as defined in the WGS-84 coordinate system (Military Standard WGS84 Metric MIL-STD-2401 (11 Jan. 1994): "Military Standard Department of Defence World Geodetic System (WGS)").

While J-STD-036 does define mechanism whereby this geospatial location can be delivered in the ISUP call setup signaling, it can be generally acknowledged that PSAPs do not support the necessary signaling interfaces nor customer premises equipment to receive and display this information. Also, there is no mechanism whereby an updated location can be delivered in the ISUP signaling. For these reasons, J-STD-036 identifies a new interface that the emergency network can use to query the cellular network. This interface is assigned the identifier of E2 and both J-STD-036 and NENA "NENA Standard for the Implementation of the Wireless Emergency Service Protocol E2 Interface" define a protocol which can be used over this interface called the emergency services protocol.

On receipt of an emergency call arising from a cellular network, the PSAP can initiate, via the serving ALI, a request on the cellular network to provide the geodetic location of the caller. This request is made over the E2 interface in a message called the EPOSREQ (Emergency Position Request) with the response message identified as the esposreq. The location of the caller is determined by positioning capabilities native to the cellular network itself and different systems of network measurement, triangulation, or special handset capabilities such as GPS (Global Positioning System) are used.

As described above, the network mechanisms and procedures defined in JSTD-036 are around the provision of a geodetic (latitude and longitude) type location for the caller. This obviously implies a capability on the part of the PSAP to display location information of this type to the PSAP operator. There is also consideration supported in the E2 interface messaging that allows the delivery of civic address type information.

One application of this facility is in the support of PSAPs which are not equipped with the capability to receive and display geodetic type location information. This is part of what is often referred to as a Phase 1 E911 capability for cellular networks. Enhanced 911 calling was introduced in two phases into the cellular and emergency services networks. Phase 2 defined the capabilities for delivering, generally more accurate, geodetic location information from the network. Phase 1 was generally targeted at providing location information to the accuracy of a serving base station location but, perhaps more importantly, that location information is delivered to the PSAP as a more conventional street, or civic, address associated with that base station. Depending on the nature of the PSAP, the ALI may provide the geodetic position and/or the phase1 civic address type information in response to the location bid.

Just as cellular networks have specific characteristics that result in new considerations for E911 compared to conventional wireline voice networks, so too do IP based voice (VoIP) networks. VoIP network users have much in common with cellular network users in that there is no specific physical point of connection which dictates their identity. Just as a cellular phone can attach to the network anywhere that there is a point of coverage, so too can an IP based phone client attach to an IP network at many and varied points and take advantage of the voice service. From this perspective, it becomes necessary to view VoIP clients as essentially nomadic or even fully mobile to ensure that all usage scenarios are covered. For certain, many VoIP clients may be relatively static in terms of location (for example, a conventional form factor desktop phone with integrated VoIP client software will tend to be as stationary as any conventional wireline desktop phone) however, this situation is not explicitly predictable by the network, so an architecture that addresses mobility ensures that all usage scenarios are covered.

In terms of emergency call routing, the VoIP network introduces some additional challenges over wireline or cellular networks. In particular, the access network associated with a VoIP network can be highly distended. That is to say, in wireline the phone is tied to the specific local switch by the incoming line, in cellular the mobile switch has specific knowledge of the serving cell which has some degree of geographic association with that switch. But, in VoIP, the client may be attached to the network in another city, state, or, even, country than the one in which the serving call server is located. There is not an immediate association to location that the call server can use to directly determine a route to a selective router before, even, the correct PSAP can be selected.

Similarly, in terms of location delivery and display, a VoIP client may be appropriately identified by a street address, being on a relatively static access point, or it may be more appropriately identified against a geodetic location, as in the case of a VoIP client connected by a wide area broadband wireless network.

OBJECT TO THE INVENTION

The invention seeks to provide a method and apparatus for determining the geographical location from which an emergency call originates in a packet-based communications network which overcomes or at least mitigates one or more of the problems mentioned above.

The invention also seeks to provide a method and apparatus for providing a routing key for routing an emergency call from a packet-based communications network node to an emergency services network node which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of providing a routing key for routing an emergency call from a packet-based communications network node to an emergency services network node in a switched telephone network, said method comprising the steps of:
receiving information about the geographical location from which the emergency call originates;
generating a routing key on the basis of the received information and pre-specified information about geographical locations served by particular emergency service network nodes.

This provides the advantage that an emergency call can be routed using the routing key to an appropriate emergency services network node. This is achieved in a packet-based network without the need to access information from the emergency services network. Thus an existing emergency services network can be used without the need for modification.

Preferably the method comprises storing said generated routing key together with the received information about geographical location. The method also comprises providing the stored information to an automatic location identification (ALI) database. In this way the geographical location information is made available to an existing emergency services communications network comprising an ALI. The emergency services network is then able to display that information and use it to dispatch emergency services vehicles.

According to another aspect of the present invention there is provided a packet-based communications network node for providing a routing key for routing an emergency call from the packet-based communications network to an emergency services network node in a switched telephone network, said node comprising:
an input arranged to receive information about the geographical location from which the emergency call originates;
a processor arranged to generate a routing key on the basis of the received information and pre-specified information about geographical locations served by particular emergency service network nodes.

According to another aspect of the present invention there is provided a method of routing an incoming emergency call in a packet-based communications network to an appropriate emergency services answering point in a switched telephone network, said method comprising:
at a call server, receiving the emergency call;
at a location gateway server, receiving a geographical location from which the call originated and using that to generate a routing key;
at the call server, routing the emergency call using the generated routing key.

Preferably a location information server is used to provide the geographical location information. This provides the advantage that the location gateway server need not be concerned with the particular methods used to determine the geographical location information.

Also, the routing key is determined and delivered dynamically within the life of the emergency call. This is achieved by using the location information server to provide the geographical location information as and when needed. This reduces and need for static information to be retained in the network including an emergency services network. In addition, it is possible to deal with nomadic entities and mobile entities whose geographical location changes over time.

In a preferred embodiment the location gateway server interfaces to the emergency services network using a known interface protocol. This enables the present invention to be used with existing emergency services equipment that already operates the specified interface protocol. This reduces costs and the need for modification of network equipment.

The invention also encompasses computer software for implementing any of the methods described above and herein.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "geographical location information" is used to refer to information about the physical position of an entity in the physical environment as opposed to a communications network address. For example, it comprises a civic address, postal address, street address, latitude and longitude information or geodetic location information.

The term "nomadic communications system" is used to refer to a communications network in which user terminals can access the network from different, geographically separated, network access points without the need for modification of the terminal in order to access the network from those different access points.

Figure 1:
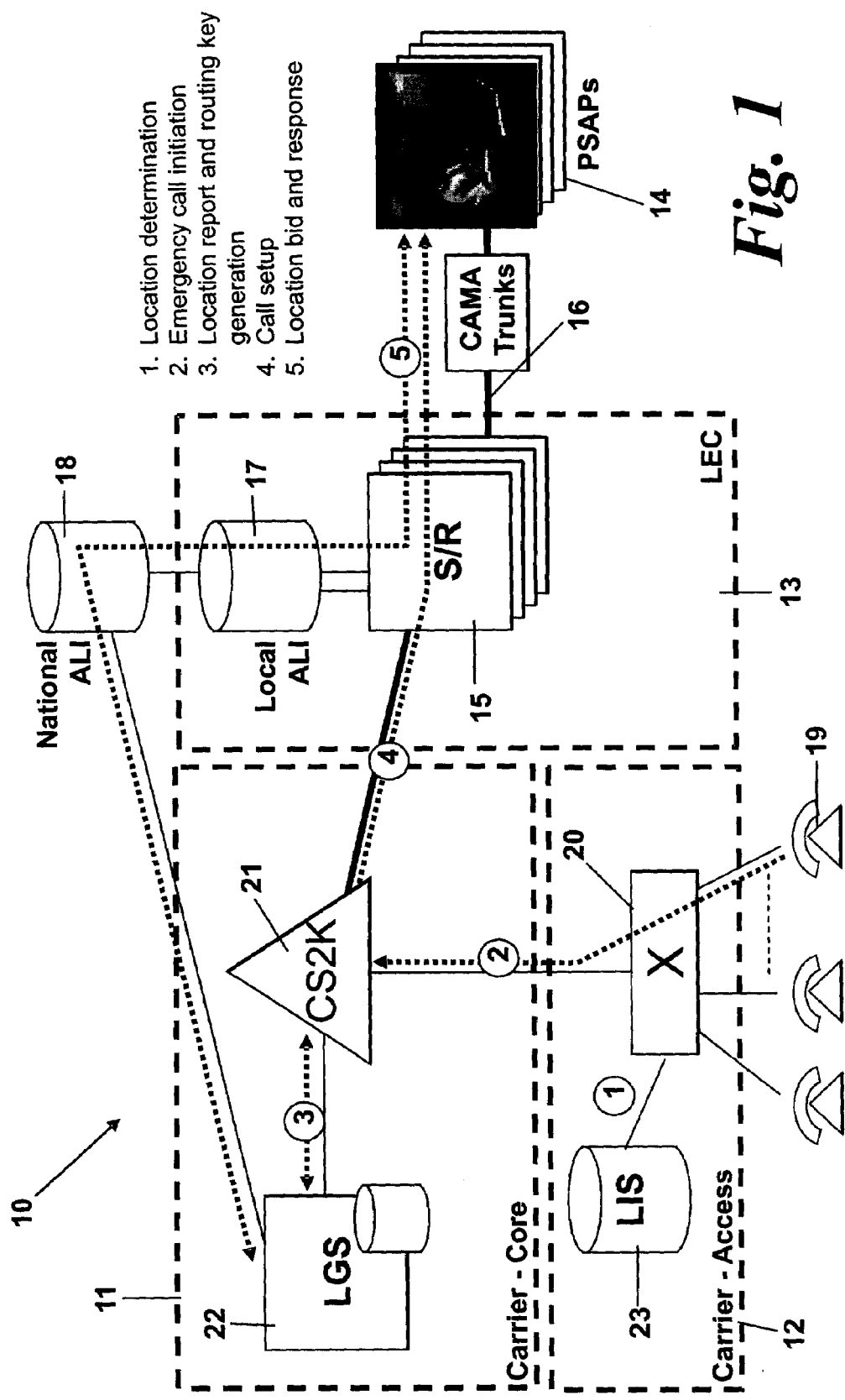
FIG. 1 is a schematic diagram of a packet based communications network comprising a location gateway server.

FIG. 1 is a schematic diagram of a packet-based communications network 10 with a core network region 11, an access network region 12, and a local exchange region 13.

A plurality of public safety answering points (PSAPs) 14 are shown, each being for serving a different geographical region as known in the art. Each PSAP has an associated selective router 15 which is a switch for routing calls, location information and other details to the PSAP. Each selective router 15 is connected to its associated PSAP by a trunk 16 or other suitable communications link as known in the art.

Each selective router 15 is linked via the communications network 10 to a local automatic location identification (ALI) database 17. This database comprises pre-specified information about a geographical address associated with each customer or user account and details of an identifier for a communications terminal for that customer account. Only information about customer accounts with geographic addresses local to the particular selective router 15 are stored in the local ALI 17.

A national ALI 18 is also provided. This comprises pre-specified information about which geographical regions each local ALI 17 serves. For example, details of every valid postal address in the USA are stored and each address is associated with a particular local ALI 17 and selective router 15.

The local ALIs 17, selective routers 15, national ALI 18, PSAPs 14 and trunks 16 are all known in the art of conventional switched telephone networks. An advantage of the present invention is that this emergency service network infrastructure is reused without the need for modification. The existing emergency service network infrastructure is integrated or connected to the packet-based communications network core 11 as using media gateways of any suitable type as known in the art.

Communications terminals 19, also referred to as clients, which are of any suitable type, are connected to a switch 20 in the access part 12 of the communications network 10. The terminals 19 are either physically connected to the network or connected via a wireless link. The switch is connected via the network to a call server 21 in the core of the network 11. Only one call server 21 and switch 20 are shown for reasons of clarity, however, many switches 20 are typically served by one call server 21 and there can be a plurality of call servers 21.

When a communications terminal connects to the network 10 on start-up of the terminal, or if the terminal is newly connected, then a registration request is sent to the call server 21 for that region of the network 10. This process is known in the art. The registration process involves the terminal sending, via the switch 20, details of its network address. The call server 21 is then able to keep track of all the terminals 19 under its remit.

In the present invention a location information server (LIS) 23 is provided. FIG. 1 shows the LIS in the access part of the network 12 although it can also reside in an Enterprise network or an access network for residential services. The LIS can also be split into two entities: probes and a main server, with the probes in an Enterprise network for example and the main server in an access network.

The LIS is arranged to detect terminals connecting to the network and determine their geographic locations. The LIS passes this information to the terminals when requested and the terminals pass it on to the call server. In addition, the LIS is able to pass the geographic location information to another entity, a Location Gateway Server (LGS) as described in more detail below with reference to FIG. 3. In that case the LGS polls the LIS for the location information.

As mentioned above the LIS determines geographic location of terminals. It does this in any suitable known manner. For example, it comprises or has access to a wiremap. This wiremap comprises details of network addresses of access ports in the access network served by the call server 21 and geographic location details associated with each network address. For example, a building address and a particular quadrant of that building. This information is pre-configured at the LIS, for example, by service providers or other network administrators. Thus when a terminal 19 is connected to a particular access port in the access portion of the network 12 there is a network address associated with that port and at the LIS geographic location details associated with the same port or network address. However, it is not essential for the LIS to use a wiremap. Any suitable type of positioning technology can be used. An advantage of using an LIS in this way is that the LGS need not be concerned with the nature of the positioning technology used.

The core network 11 also comprises a location gateway server (LGS) 22 connected to the call server 21 and also linked to the national ALI 18. The LGS is a novel network entity for use in the present invention. The LGS 22 is arranged to determine routing keys also known as emergency services routing keys (ESRKs). A routing key is used by the call server 21 to route an incoming emergency call to an appropriate selective router 15 and PSAP 14. In order to determine the routing keys the LGS operates in conjunction with the LIS 12 and national ALI 18.

In a first embodiment of the present invention the LIS is arranged to detect when a terminal newly starts up or connects to the network. The LIS determines a geographic location for that newly connected terminal using any suitable method as known in the art. For example, the LIS accesses a wiremap as mentioned above and uses that together with a network address of the terminal to determine an associated geographic location. Alternatively, a global positioning system is used or an emergency caller specifies his or her own location.

Figure 2:
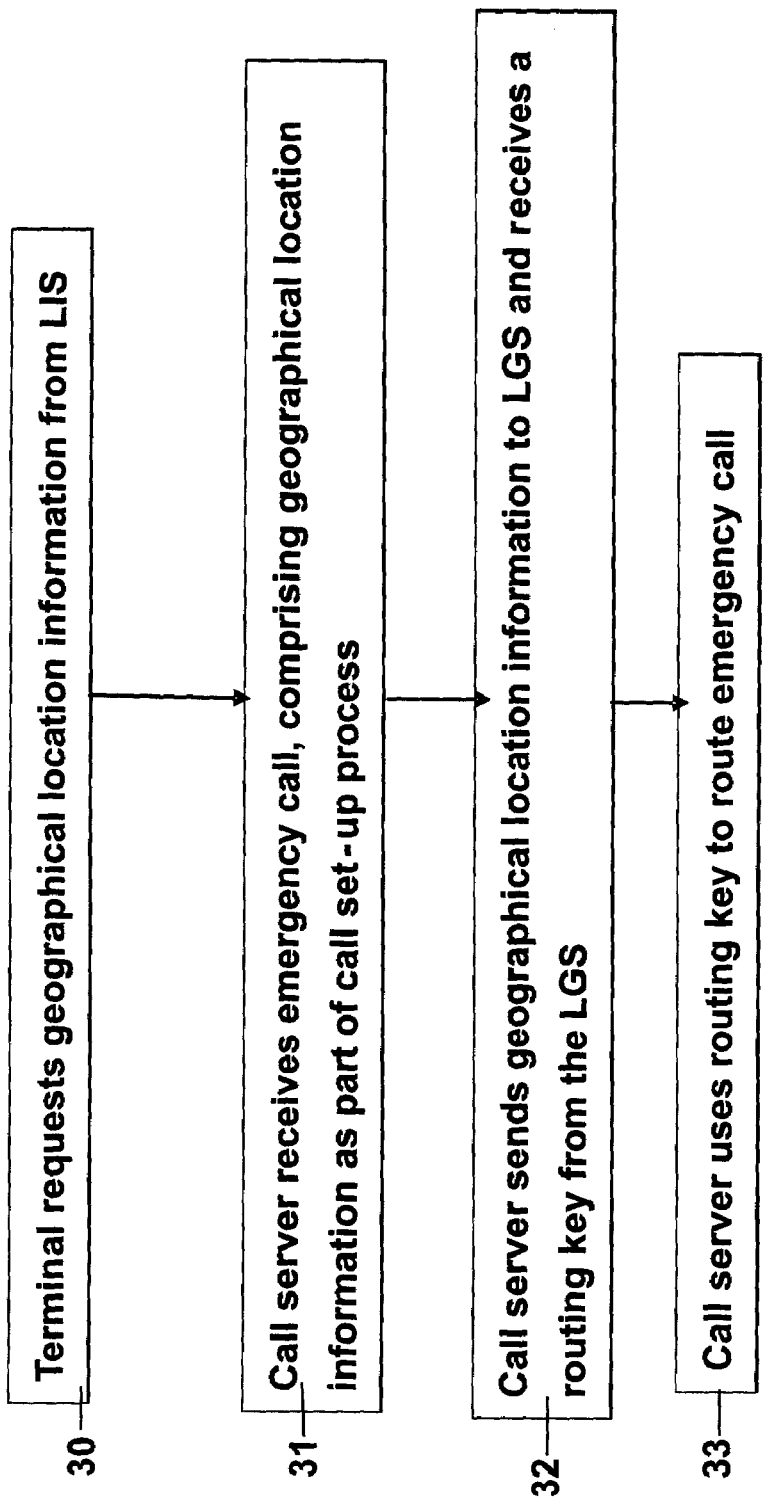
FIG. 2 is a flow diagram of a method of operating a call server to route an emergency call.

In the event that an emergency call is made from one of the terminals 19 that terminal 19 sends a request via switch 20 to the LIS 23 for its geographical location (see box 30 of FIG. 2). That geographic location information is returned and sent by the terminal 19 to the call server 21 as part of the call set-up process (see box 31 of FIG. 2).

The call server then sends the geographical location information to the LGS. For example, this information is sent in the form of a subscriber location report (SLR) and comprises a call back number for the emergency caller as well as the geographical location information (see box 32 of FIG. 2.) However, this is not essential, any suitable form of message can be used to send the geographical location information.

The LGS uses the geographical location information to determine the relevant selective router 15 and PSAP 14 and generates an appropriate routing key. The LGS stores the geographical location information together with the routing key in a cache or other suitable memory. The routing key is made available to the call server (see box 32 of FIG. 2) which then routes the emergency call to the specified selective router 15 (see box 33 of FIG. 2) via a media gateway. The selective router 15 then delivers the emergency call to the appropriate PSAP together with the routing key generated by the LGS. In some cases instead of a routing key a pseudo-ANI generated by the selective router and the local ALI is sent to the PSAP instead of the routing key.

In the method described above with reference to FIGS. 1 and 2 the LIS is arranged to provide geographical location information to terminals which then provide it to the call server. However, in some situations the location information does not reach the LGS. For example, if there is an error in transmission and packets are dropped. Also, there are situations in which the user terminal is a wireless device that is moving. In that case it may not be possible for the LGS to keep up to date with the rapidly changing location of the mobile terminal.

A second method for enabling the location information to reach the call server is therefore proposed and is now described with reference to FIG. 3. This method is preferably used in conjunction with that of FIG. 1 although that is not essential; the two methods can be used independently of one another. Using the methods independently, although not as fool-proof as using them together, is acceptable in some cases. For example, where location information is available via another means. This other means can be for example, explanation from the emergency caller him or herself or a separate global positioning system device of the emergency caller.

Figure 3:
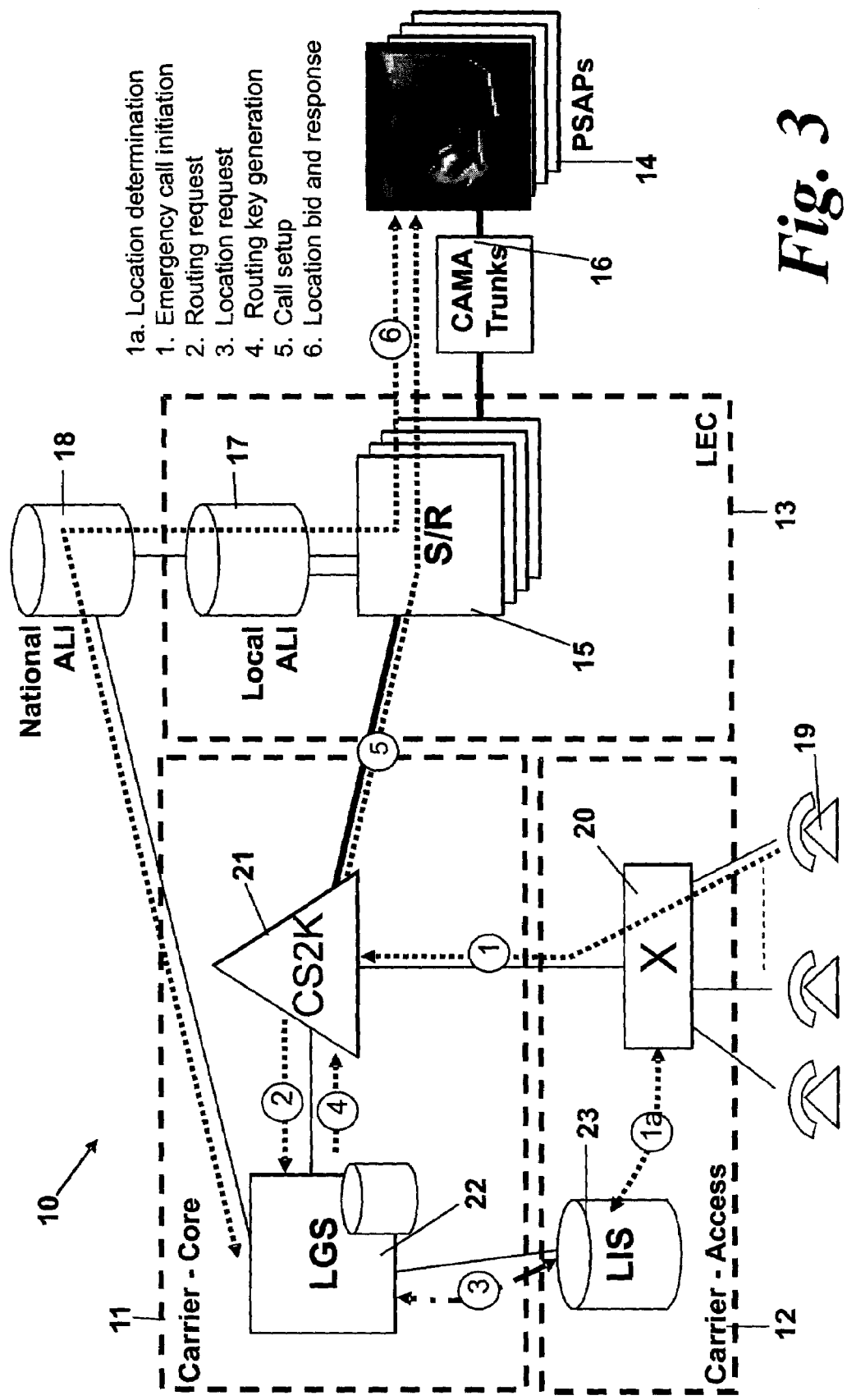
FIG. 3 shows the communications network of FIG. 1 with a connection between the location gateway server and location information sever.

FIG. 3 shows the same components as in FIG. 1 and the same reference numerals are used as appropriate.

In this second method the LGS 22 polls or queries the LIS 23. For each port at the switch 20 to which a terminal is connected the LIS determines an associated geographical location as described above with reference to FIG. 1. Thus in this second method the LGS polls the LIS rather than waiting for geographic information sent from the call server. The LGS is also able to do both these things; that is, poll the LIS for the geographic information and receive it from the call server.

Consider the situation when an emergency call is made from one of the terminals 19. This call reaches the call server 21 as known in the art and the call server 21 receives an identifier of the calling terminal as part of the call process. The call server then sends a message to the LGS requesting geographical location information for the emergency calling terminal. The message comprises a subscriber location report or any other suitable type of message. The message comprises the identifier of the calling terminal as well as details of the LIS associated with the call server 21.

The LGS itself does not have the geographical location information requested and so it queries the LIS for that information using the identifier of the calling terminal.

As in the method described with reference to FIG. 1, the LGS uses the geographical location information to determine the relevant selective router 15 and PSAP 14 and generates an appropriate routing key. The method then proceeds as described above with reference to FIG. 1 such that the emergency call is routed to the appropriate PSAP and the location information is also delivered to the PSAP.

Thus both the first and second methods described above involve using the LIS to determine the location from which an emergency call originates. In the first method the LIS sends this geographical information to a terminal which sends it to the call server during call set up. In the second method the LGS actively polls the LIS for the geographical location information.

The methods described thus far enable an emergency call to be routed to the appropriate PSAP. In order for the PSAP to also obtain the geographical location information of the emergency caller an interface is provided between the LGS and the emergency services network. This is now described with reference to FIG. 4.

Figure 4:
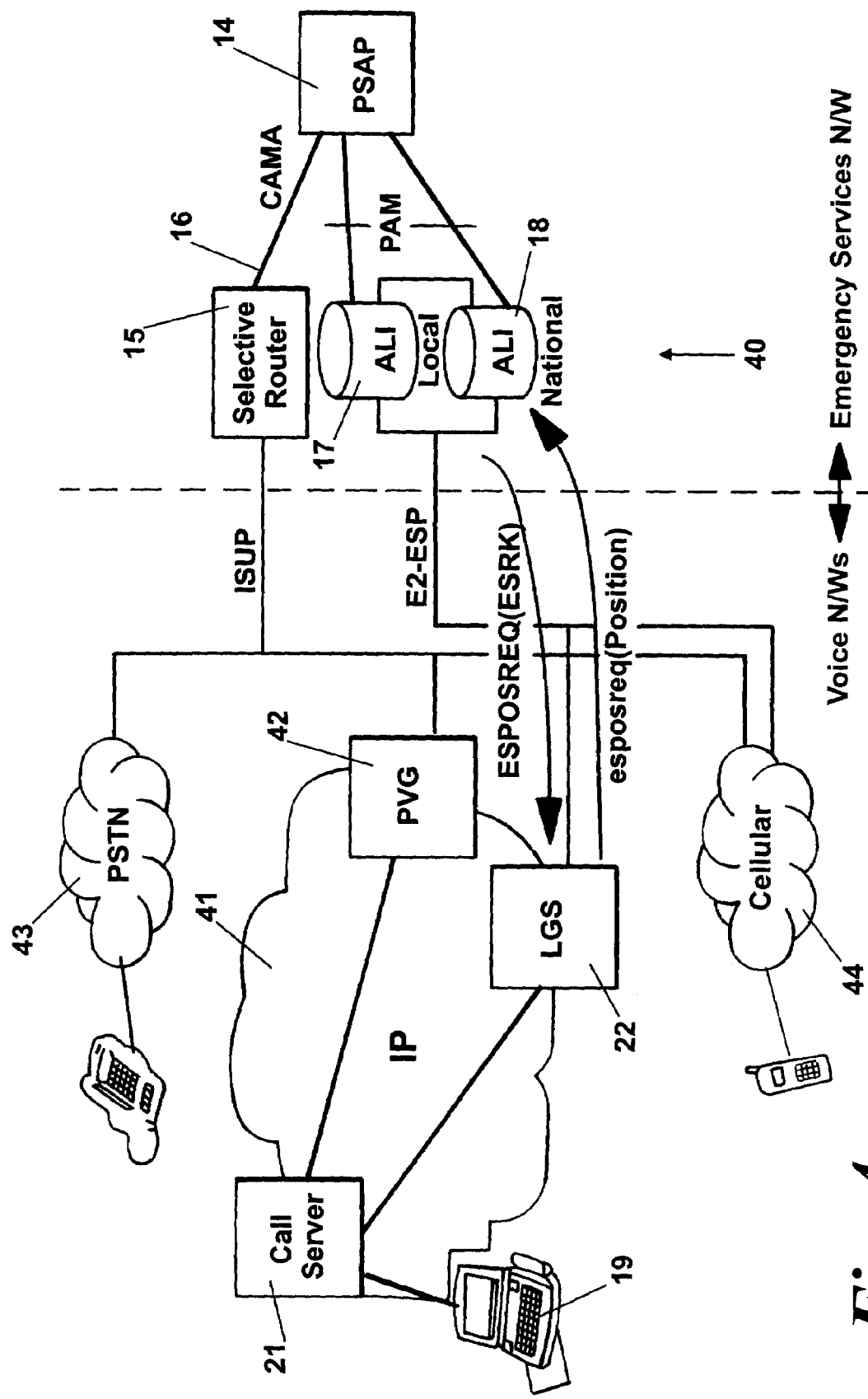
FIG. 4 is a schematic diagram of another embodiment of the communications network of FIG. 1.

FIG. 4 is a schematic diagram of another embodiment of the network of FIG. 1. The same reference numerals are used as appropriate. An emergency services network 40 as known in the art of conventional switched telephone networks is connected to a packet-based communications network 41 via one or more media gateways 42. A conventional public switched telephone network 43 is also connected to the emergency services network 40 via any suitable type of interface such as an ISDN User Part (ISUP) interface, as is a conventional cellular network 44. In a preferred embodiment of the present invention an interface between the LGS 22 and the emergency services network 40 is provided using the same method as used to interface between location gateway entities in a cellular network and an emergency services network. At least part of the present invention lies in the realisation that an interface from a cellular network can be reused to integrate a packet-based network and a conventional emergency services network. Preferably the E2 interface standard defined in TR45 J-STD-036 "Enhanced Wireless 9-1-1 Phase 2" Telecommunications Industry Association, 2000 is chosen although any other suitable interface method can be used. The aforementioned document is incorporated herein by reference.

FIG. 4 shows the LGS 22 connected to the local and/or national ALI of the emergency services network 40 using an E2 emergency services protocol (ESP) as mentioned above. This ESP allows the emergency network to make a request for a caller location which is then delivered for display to a PSAP operator.

For example, the PSAP sends a query to the local ALI 17. In FIG. 4 this query is referred to as ESPOSREQ (ESRK). The query contains details of the routing key and requests the associated geographical location information.

The local ALI 17 forwards the query (also known as a bid) to the national ALI 18 which in turn forwards the query to the appropriate LGS 22. The LGS has previously stored the routing key together with the geographical location information and so it is able to return the geographical location information to the national ALI. This is shown in FIG. 4 as esposreq (Position). From there it is returned, via the local ALI, to the PSAP.

At the LGS, the cached routing key and location information are cleared from memory when appropriate. For example, after a pre-specified time interval or at the end of the emergency call. In the latter case, the call server 21 is arranged to send a message indicating call terminal to the LGS. The message is of any suitable form such as a subscriber location report.

More detail about particular examples of the present invention is now given.

Emergency Call Routing

For the sake of simplicity, the following discussion is based on the assumption that the Selective Router will use an ESRK provided in the ISUP call setup (IAM—Initial Address Message) to select the correct outgoing CAMA trunk for the corresponding serving PSAP. However, it is not essential to use an ESRK. Any suitable key such as an ESRD can be used instead.

Trunk Media Gateway (TMG) to Selective Router Routing

Opening up the VoIP network cloud, we can see that an emergency call needs to be delivered into the wireline voice network in order to enter the existing emergency services network. In VoIP networks, this is done by transiting the call out of the IP network and into wireline network via a Trunk Media Gateway (TMG).

Since there are no dialed digits that can be used to effect routing of the emergency call (911 does not identify a unique destination), it is necessary for the TMG selected to have direct ISUP trunking capability to the selective router(s) that it supports routing to. To reuse the cellular mechanism for call routing, the TMG needs to provide a unique ESRK to the selective router. That is, the TMG ISUP signaling preferably supports the inclusion of this parameter in the IAM message. Further, if the TMG has outgoing trunks to more than one selective router, it needs to be instructed as to which trunk to select based on the ESRK. That is, in the absence of routing based on dialed digits, the TMG needs to be told which outgoing voice trunk and ISUP signaling destination to select based on the value of the ESRK for that call. This implies a routing table that the network will use to ensure that the TMG is appropriately directed.

Call Server to TMG Routing

Looking further back into the VoIP network cloud, we see that the VoIP call itself is under the control of a call server. This network entity provides at least the equivalent functionality of a wireline switch or a cellular mobile switching center. The call server is responsible for setting up the initial state associated with an emergency call and routing it to the correct destination.

As has been noted at each step, the dialed digits do not provide a definitive route to the destination and, as noted in the previous section, the TMG outgoing trunk needs to be selected based on the ESRK so the appropriate selective router is trunked to. Since the call is delivered to the TMG by the call server, it is the responsibility of the call server to provide this ESRK in the IP based call setup and corresponding trunk selection through the TMG.

Since the call server has the responsibility to select a TMG based on the ESRK, the existence of a routing table within the call server is implied. This table allows the call server to associate a TMG with a given ESRK value.

Location Based Emergency Call Routing

This section describes an example of how the call server determines the ESRK associated with final destination PSAP. This is addressed by the introduction of a new network entity called the Location Gateway Server (LGS). This network entity supports two key functions:

On request from a call server, and given the identity of an emergency caller/client, it obtains the location of that client from the IP access network. For routing purposes, this location may be provided as a geodetic (latitude/longitude) location.

Based on the location determined, and using a native spatial database capability which can identify an emergency services zone corresponding to a destination PSAP, it generates a unique and applicable ESRK value that will indicate a route to the correct serving PSAP.

A single message and response is defined between the call server and the LGS which is used by the call server to request the ESRK. These are the EmergencyCallRequest (ECR) and the ECResponse messages. The key parameters of the request and response are the client ID in the former and the ESRK in the latter.

A second message, ECTerminate, is also required to indicate the termination of the emergency call. The LGS maintains transient state information associated with emergency calls in progress. It needs to allocate an ESRK out of a pool of available numbers and it needs to be able to return the ESRK to this pool at the conclusion of the call. Thus, it is important for the call server to provide a message to the LGS indicating that the call is terminated. The ESRK associated with the call and provided in the call termination indication message provides the necessary state association for the LGS.

It is also possible for the call server to provide the initial location of the client in the message to the LGS. This is also useful in a situation where there is no LIS and clients/users specify their own location (e.g. picked from a menu).

Emergency Caller Location Delivery

The question of how an LGS determines the location of a client device is described later. Before looking into that question, the other aspect of location—the delivery of it to the PSAP operator—is examined.

As has been noted, the location of a VoIP client can be a transitory piece of information. As such, it is not adequate—as a general solution—to rely on a static data entry accessible by the emergency network and keyed against the CLID. As with cellular networks, the information associated with a subscriber should be determined, and is only valid, within the time that the call is active. Outside the period of duration of the emergency call, the emergency network stores no information and has no knowledge related to the identity or location of the subscriber.

In order to support Phase 2 E911 requirements, J-STD-036 defined the E2 interface between the ALI entities in the emergency services network and the location gateway entities (GMLCs and MPCs) in the connecting cellular networks. The emergency services protocol (ESP) supported over this interface was defined by both J-STD-036 and in the NENA publication mentioned above.

An embodiment of this invention teaches that this same E2 interface and ESP protocol specification be reused on the LGS to support the delivery of location information associated with VoIP emergency calls.

The ESRK becomes a reference to the call in progress as well as being the routing indicator used in call setup. ESP allows the emergency network to make a request for a caller location which can then be delivered for display to the PSAP operator. The LGS already has the location information for the client since it was used to deliver the call routing information. By caching this location in conjunction with the ESRK call-in-progress, state, the LGS is able to provide this location information in the esposreq sent in response to a request made over the E2 interface by the emergency network.

Mid-Call Location Updates

Since cellular subscribers can, by definition, be mobile, the ESP semantics also support the ability for the emergency network to request an updated location for the caller. Using the same call identifier (e.g. the ESRK) as was used to request the location initially, the same ESPOSREQ message is used to request an updated location. That is, there is a parameter in this message to indicate which type of location—initial or updated—that the emergency network would like. If an updated location is required, the cellular network knows that it should utilize its resources to see if a more up to date location is available.

This same mechanism is used in an embodiment of the present invention for the VoIP network. While in initial deployments, the IP access networks may only return relatively static locations (e.g. from switch port wire mappings), future deployments will be able to exploit advanced positioning technologies that can track a mobile IP device, just as they can a mobile cellular device today. Since the semantics for requesting an updated location are already supported on the E2 interface, there will be no changes necessary to the emergency network in order for it to exploit this tracking capability.

Civic Address and Geodetic Location Support

The introduction of Phase 2 E911 support for cellular emergency callers introduced the concept, and the precedent, that the location of the caller may actually be provided to the PSAP as a geodetic location. This has necessitated changes to PSAPs such that to be Phase 2 capable they need not only the ability to display a location in this format to an operator but also that these PSAPs have the necessary procedures and policies in place to relay location information in this form to emergency response teams and be able deal with accuracy that can vary below 100 meters at the 67th percentile and approach arbitrary levels of inaccuracy for the other ⅓ of calls.

This precedent can be taken advantage of for VoIP clients where, in the absence of a civic address which can be displayed to the PSAP operator, a geodetic location—just as is used for phase 2 cellular location—is provided in an embodiment of this invention.

However, this does not mean that emergency calls from IP based voice networks need always be restricted to geodetic based location reporting. As discussed, the ESP signaling parameters as defined by NENA includes a parameter called "location description". The NENA specification defines a number of different XML tag based fields that can be used to constitute this parameter. This opens the possibility that the LGS, in responding to an ESPOSREQ request over the E2 interface, can utilise this parameter to also provide a civic address for the caller.

In cellular systems, this parameter has a nominal use around supporting phase 1 capable PSAPs where the location description provided will generally correspond to a street address identifier for the serving base station in the cellular network. However, this use does not preclude the alternative use in IP based voice networks.

Where VoIP clients have a relatively static location—for example, where the client is a conventional telephone form factor device with a relatively fixed desktop location—then the access network, which provides location to the LGS, may opt to provide a civic address encoding in addition to the geodetic location. A discussion on general location determination and the associated signaling is given below.

A valid question is how the emergency services network can know that it is receiving a civic address for the caller rather than a nominal base station address. This can be discriminated in a number of ways. The key is that the emergency network can be aware that it is interfacing to an IP based voice network rather than a cellular network. Three potential ways to perform this discrimination are:

The emergency network will generally select the E2 interface that it needs to send a request to on the basis of the ESRK associated with the call. ESRKs tend to be allocated to network operators in pools. This same association can allow the emergency network to infer the nature of the connecting network.

The esposreq response contains a parameter which is the Company ID. This can be used by the emergency network to distinguish IP vs cellular carriers.

The position data parameter in the esposreq which contains the geodetic location also contains a sub-parameter called "position source" which indicates the technology used to establish the location.

New code points can be allocated for IP network positioning technologies. This could be used by the emergency network to establish that the location is being provided by an IP voice network.

The example mechanisms discussed above identify how the existing cellular E911 phase 2 infrastructure and interfaces in the emergency network can be effectively reused with little or no modification to support the delivery of caller location from IP based voice networks.

In order to minimise the need to transform and translate the information related to location, in a preferred embodiment the specifications used for this on the E2 interface are reused within the signaling of the IP network. That is the geodetic location coding defined by NENA in the document referred to above as well as the XML tag encodings defined in "Real Time ALI Exchange Interface Agreement—Issue 6.1", AT&T and Pacific Bell, Mar. 25, 1995 by NENA are also preferred for use between the IP network elements as they are delivered through to the LGS.

End to End—Adding Location Determination

There are numerous approaches to location determination within IP networks and any suitable approach can be used in the present invention. A number of things will affect the type of solution put in place. Amongst these are:

The nature of the connection used by the client. That is, whether it is a domestic broadband connection, an enterprise IP switch connected client, a wireless client connecting via a campus wireless LAN, etc.

Legacy circumstances. That is, the extent to whether the clients, access devices, and switches have native support for location delivery versus the need to overlay a solution for location determination on existing infrastructure.

The type of location information and accuracy required for a given target environment. For example, are static civic addresses with sufficient geodetic accuracy for routing sufficient or is a more accurate geodetic location required in the absence of a civic address?

The NENA website itself has a number of submissions and proposals around different positioning technologies for IP and any one of these may be adopted in a given access network.

The Location Identification Server—LIS

An embodiment of this invention proposes that an intermediate network entity be defined which provides a uniform query interface to the LGS network element such that it need not be concerned with the nature of the positioning technology used.

The newly identified network element is the Location Identification Server (LIS). This network element sits between the LGS and the access network and invokes the applicable positioning technologies. It supports a simple request/response message that allows the LGS obtain the location of a client.

Client Identifier Options

In order to do this, the LGS needs to provide a client identifier which is meaningful to the LIS and significant within the access network that the client is attached through. Types of potential client identifier vary but some candidates are:

Ethernet MAC address

MSISDN—international encoding of corresponding dialable digits

RFC 2486 Network Address Indicator—user@realm style address

SIP URL address

Some other network element, e.g. LIS, generated handle to the client that is independent of other addressing schemes.

The above list is by no means definitive but the definition of the query messaging between the LIS and the LGS is defined such that these and other forms of client identification can be supported over this interface. An important driver of the form of client identification supported is which identifier can be provided by the call server function in its request to the LGS. Any practical network deployment will need to ensure that the same client identifier form can be used meaningfully by the call server, LGS, and LIS.

By way of example, in initial implementations of this architecture where the access network and client devices are largely legacy, and without native location determination capabilities, the likely candidate for many deployments may be the MAC address.

An example of an end to end solution using a LIS that employs SNMP bridge MIB polling and MAC address association is described below with reference to FIG. 7.

Geodetic vs Civic Address Location—Revisited

As discussed above, location may be provided as a geodetic location for the purposes of call routing plus, optionally, a civic address that can be displayed to the PSAP operator. The parameter in the response message from the LIS to the LGS that specifies the returned location preferably supports a coding that supports both of the location formats concurrently. The geodetic location is provided in order to support emergency call routing. Also as discussed above, it is preferred that the specifications used for coding location are the same as those on the E2 interface. That is the geodetic location coding as well as the XML tag encodings defined by NENA are preferably used to encode the location provided to the LGS by the LIS. This eliminates the need to translate and transform this information as it is passed from the LGS to the emergency services network.

The architecture that has been described herein—from the LIS through the LGS, call server, and PVG network entities interfacing to the emergency services network ISUP and E2 interfaces—should meet the needs of emergency calling from VoIP networks well into the future. Further, as more standardisation occurs at the IP access and native positioning support is deployed, this transition to more reliable and accurate location determination will be able to occur seamlessly without impacting the VoIP to emergency network interface. The changes will be perceived as an improvement in coverage and quality of service for VoIP emergency callers as well as ease of deployment for VoIP operators but without impacting the operation of the emergency network generally.

In addition to the above, as the emergency network infrastructure evolves away from the current legacy of CAMA trunks and PAM interfaces, individual PSAPs will be able to interface directly to the IP network. The same functions of call routing and location delivery will still be needed and the mechanisms described can still be utilized. Instead of routing out to ISUP trunks, the call server can direct the call to a direct VoIP based ACD function. The ESP messaging referred to above is already IP based and the option becomes available for updated PSAPs to query the LGS directly instead of their requests being proxied through an ALI.

Using DHCP to Improve Client Integration

Since the identity, location, and capabilities of the LIS will vary from access network to access network, it is preferred that in some embodiments DHCP be used to advise IP clients of the identity of the serving LIS. This permits two major optimisations:

The client will be able to explicitly register with the LIS so that it is known to that entity for purposes of location. This will also establish a signaling relationship that can be used for advanced positioning mechanisms if supported. It also offers the opportunity for the LIS to assign a client-specific identifier which the client can provide to network services such that no other client key is required for the purposes of location requests through the LGS/LIS network.

The call setup signaling to the call server can be modified to support the ability of the client to forward the serving LIS identity to the call server. This in turn can be communicated as part of the location request to the LGS, permitting the LGS to have explicit knowledge of the appropriate LIS to query.

Figure 5:
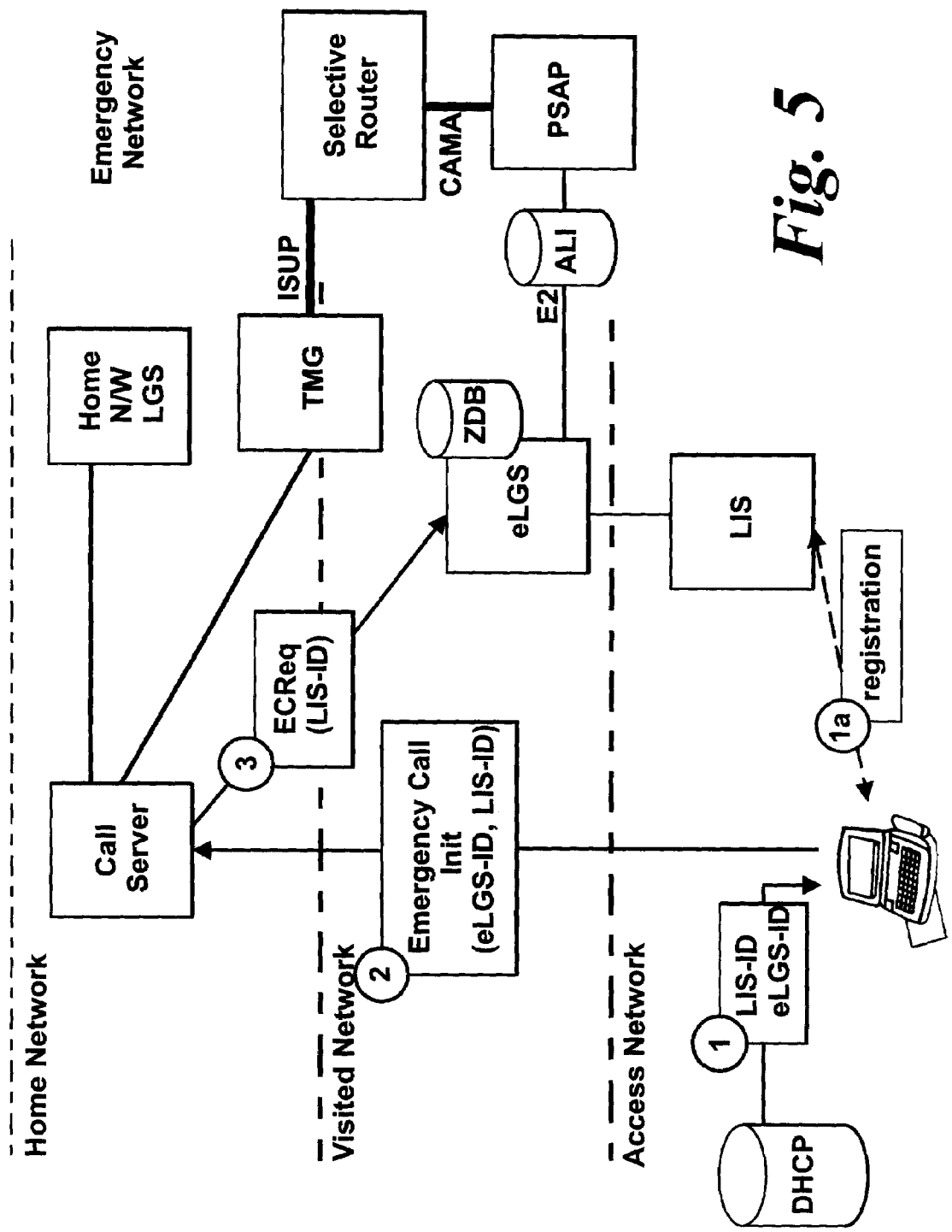
FIG. 5 is a schematic diagram of a communications network comprising a DHCP (Dynamic Host Configuration Protocol) server suitable for use in an embodiment of the invention.

These embodiments are illustrated in FIG. 5.

Supporting International Emergency Calling

It is an interesting characteristic of VoIP networks that the distance between a client user and the call server handling the call processing may be arbitrarily great. A VoIP client can typically use the same call server regardless of the point of attachment to the network. So, the client may be in a different city, a different state, or even a different country.

It has been an implicit assumption in the discussion to date, that the call server has inbuilt knowledge of the LGS that it should inform of the incidence of an emergency call and request routing information from. While this may hold true of a nationwide carrier with points of presence across many states, it may prove difficult for some VoIP network operators to provide the same ubiquity of presence. When the question of supporting international calling is raised, then it becomes even less likely that this assumption will apply.

This constraint will likely continue for the short term. However, the use of DHCP may, in the future, also provide a mechanism for dealing with this. In this instance, the registration of a client on a local network involves not only an indication of the serving LIS identity but also an indication of the applicable emergency LGS (eLGS).

With this facility, the client can provide the eLGS identity to the call server. This introduces the possibility of a network of regional LGS platforms to serve the VoIP network. The ESRK allocation pools can be efficiently distributed between these LGS and they can retain the responsibility of maintaining the spatial boundary information for the emergency service (PSAP) zones in their regions.

The signaling associated with this scenario is also shown in FIG. 5. Note that the call server was able to refer to an eLGS in the visited network rather than the one in the subscriber's home network. This allowed the appropriate ESRK for the PSAP in the visited network operator's region to be allocated by that operator. Further, the PSAP in that region only needs to have an E2 interface association with that network's LGS and not the home network LGS.

The arrow labeled in FIG. 5 shows that the DHCP server provides LIS and eLGS identities to the client on initialization. Arrow 1a represents the optional step whereby the client registers with the LIS to establish a signaling relationship for future positioning. As shown by arrow 2 the client then provides eLGS and LIS identities to call server on emergency call initiation. Then in the step shown by arrow 3 the call server provides LIS identity to eLGS in emergency call request.

Enterprise Versus Carrier VoIP Network Deployment

In the embodiments described so far it has been an assumption that the VoIP network operator has sufficient points of presence in each of the regions of interest to be able to route the emergency calls onto the local network and into the emergency services network. This is typically true of a public carrier network which operates its own PVG platforms that tandem directly into the public wireline network but it is less likely for an enterprise operating a VoIP network over its intranet.

In the case of an enterprise VoIP operator, this may not be an issue where the PABX or other PSTN gateway utilised by that enterprise is colocated with its user population. However, if the user population is widely geographically distributed via a wide area intranet and/or VPN links and they share a common PSTN gateway, then there is no native mechanism to support routing to the correct PSAP.

For a colocated user population, the class 5 switch in the local operator network which provides the enterprise service looks after the subsequent routing of the 911 call to the correct selective router and PSAP.

This local exchange interface does not support the use of an ESRK in the call setup signaling to indicate a preferred route and a local exchange will not tend to support the necessary trunking to remote selective routers for out-of-region callers.

For small and medium enterprises, it would not necessarily be economical to operate an LGS nor would it be optimal to distribute ESRK pools around arbitrary numbers of enterprises.

Despite these constraints, it is still desirable to utilise the embodiments that have been described herein as the challenge of routing calls from geographically distributed callers needs to be addressed. While there are alternative proposals these tend to rely on direct dialing local access numbers for PSAPs. While this is effective in the short term, it is by definition bypassing the existing mechanisms and processes for emergency call distribution.

At least two possible approaches to supporting the enterprise environment in the long term exist.

Through the standards process, the local operator switch interface could be modified such that the ESRK can be delivered in the call setup.

This approach has a number of limitations including the fact that the time lag in defining this signaling and having switch vendors implement and deploy it can be very large. More significantly, it doesn't address the concern that the local operator and switch is unlikely to maintain direct trunks to all required destination selective routers.

Enterprises can seek emergency service support from public network carriers that support VoIP deployments. This means utilising the LGS and PVG resources of the public carrier but only for the purposes of emergency call routing.

In this situation, the enterprise would still provide the LIS functionality within their intranet IP access. Using the equivalent of the DHCP mechanism described above, the enterprise client can be advised of the carrier LGS applicable to emergency calls in that location and relay this to the call server at call setup. At the same time the identity of the serving LIS can also be relayed via the call server to the LGS.

Figure 6:
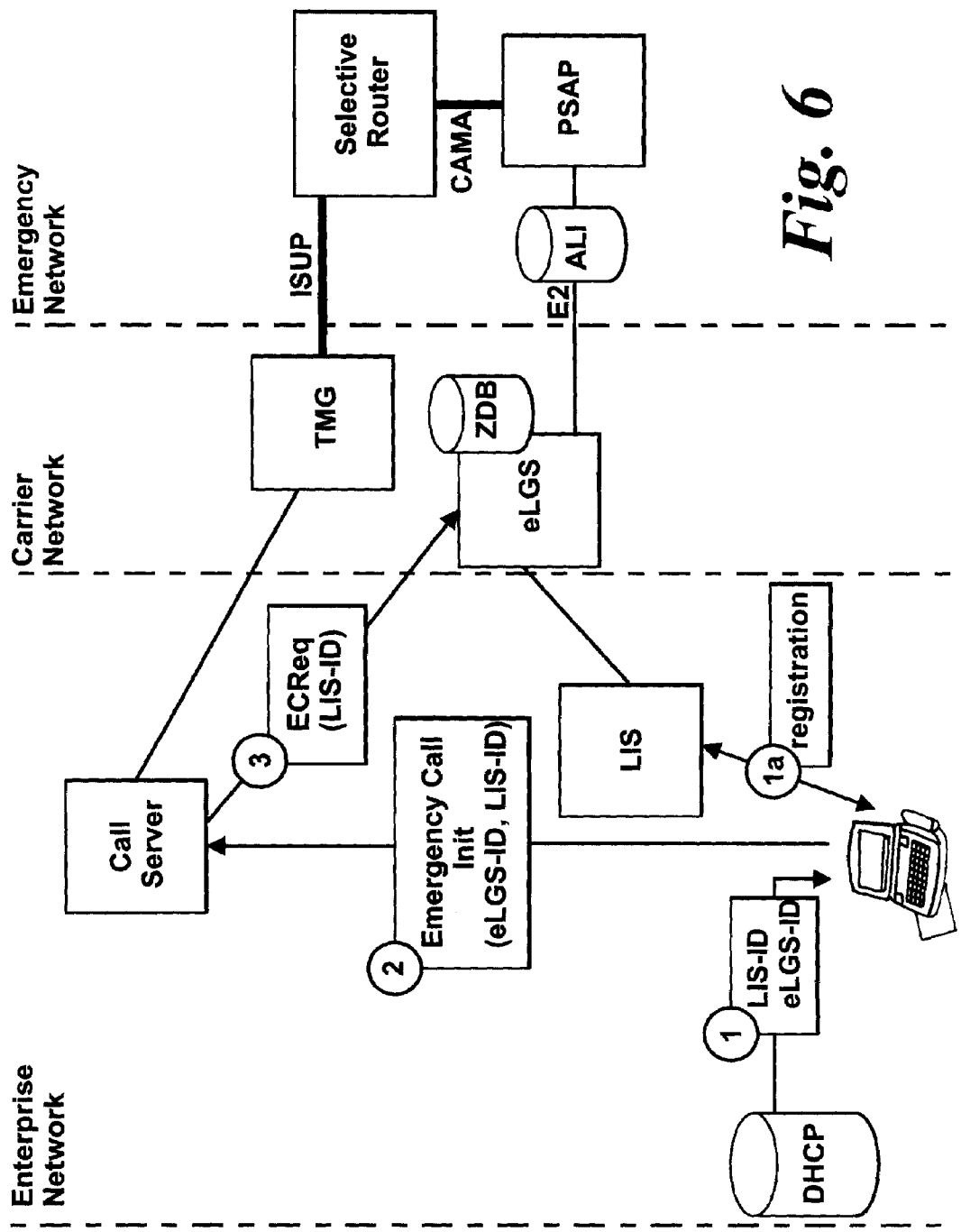
FIG. 6 is a schematic diagram of an enterprise client and call server using a carrier Location Gateway Server (LGS) and Trunk Media Gateway (TMG) to route emergency calls into an emergency network.

This arrangement is illustrated in FIG. 6.

Figure 7:
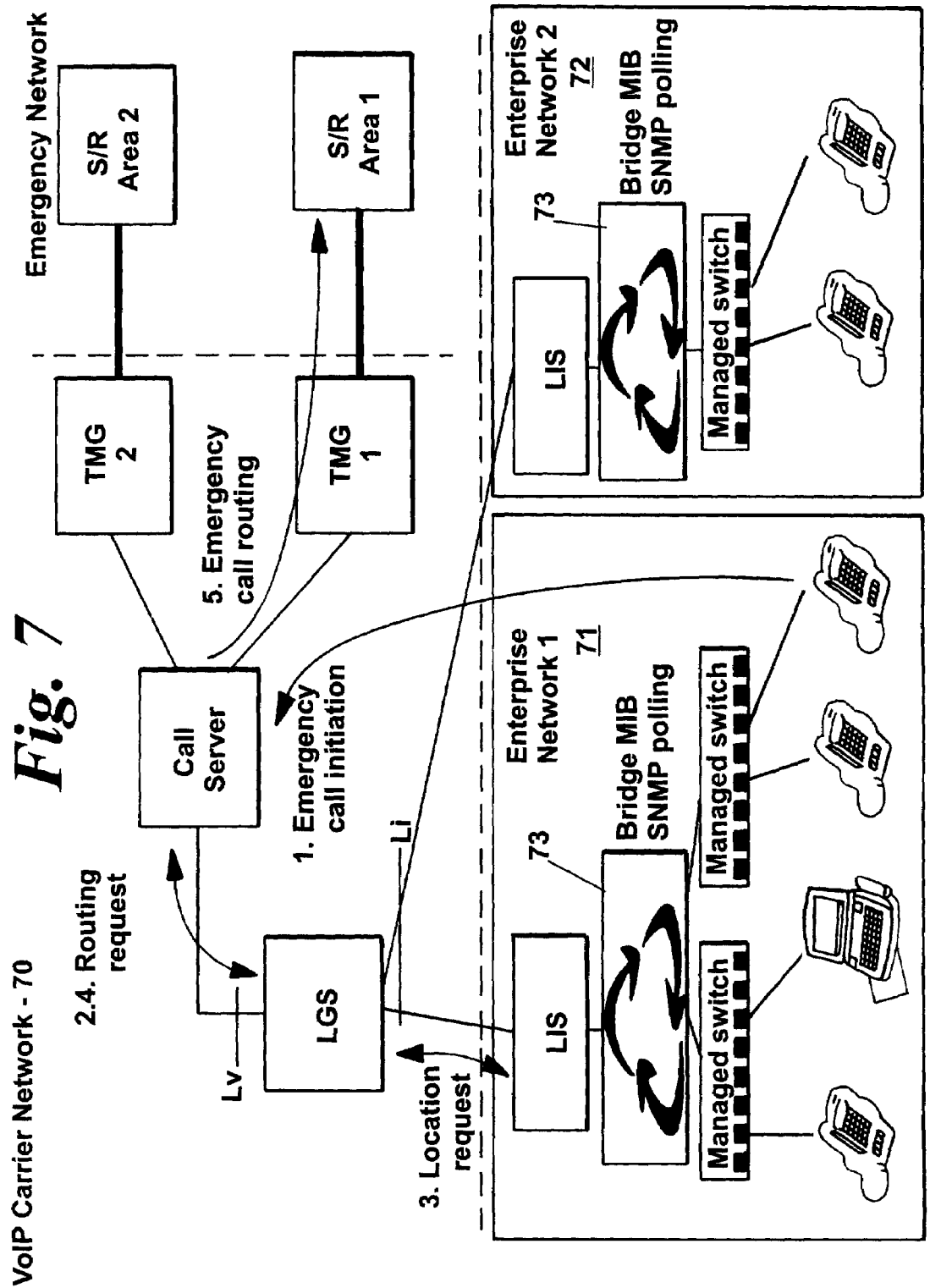
FIG. 7 is a schematic diagram of a carrier voice over internet protocol (VoIP) deployment serving enterprise customers with network based VoIP service from legacy clients connected via conventional managed switches.

FIG. 7 shows a simplified example of a VoIP deployment where the network operator is a carrier 70 and the subscriber population are within enterprise managed networks 71, 72. That is, this shows virtual private voice network deployment, where the call services are operated on an IP network with call serving functionality outsourced from the enterprise to the carrier.

In this example, it is assumed that each of the enterprises operates the voice network under the constraint that all voice clients need to be connected via specific IP switches supporting a standard SNMP bridge MIB 73 that permits port scanning to occur and also permits the MAC address of connected clients to be retrieved.

Further, the client implementation and protocol are conventional but include the delivery of the client MAC address as part of the native call signaling with the call server.

These constraints permit the operation of the network such that the MAC address can be used as a query key between the call server and LGS (Lv) interface and the LGS and LIS (Li) interface. The LIS implementation in this case involves the continuous SNMP polling of managed switches according to provisioned data which includes the list of managed switches, their ports, and the nominal location of the end-cabling attached to those ports—as both a geodetic location and, optionally, a civic address. On each poll cycle, the LIS stores any connected MAC address values against the port records within this wire map.

A query to the LIS from the LGS, then, simply results in the stored location information in this wire map being keyed from the provided client MAC address in the query. This location information is returned for subsequent processing by the LGS as described herein.

This example illustrates how the complexities of location determination in the access network are abstracted away from the rest of the emergency call handling. Other examples of LIS implementations would be those that could map a DSLAM port to a physical home address location for ADSL broadband internet based subscribers. Again, the details of how this particular LIS performed this function would be hidden from the rest of the VoIP network.

This embodiment provides the advantage that there is now a seamless migration path to native positioning systems that will not impact the network beyond the access interface to the LIS.

Call Back Number Considerations

One of the current limitations of the existing emergency services network is the ability to support callback number reporting to the PSAP where that callback number exceeds the number of digits used for a normal local dialable number. Examples of callback numbers that may not be supported are:

International callback numbers such as international roaming cellular callers or, in future, international roaming VoIP callers.

Enterprise callers to emergency services where the terminal callback number is not delivered in the call setup information.

The use of E2 as a dynamic query interface also facilitates the delivery of callback information. Since this information is delivered out of band from the call setup, it isn't subject to the same constraints as imposed by the selective router and CAMA trunk infrastructure.

The callback number is one of the parameters in the esposreq message in ESP. This allows the originating voice network which uses the E2 interface the ability to deliver an appropriate callback number, if available, for the particular call in progress. The LGS then can also be used to query the access network or be informed by the Call Server, as appropriate, of a callback number to cache in anticipation of the PSAP query.

Figure 8:
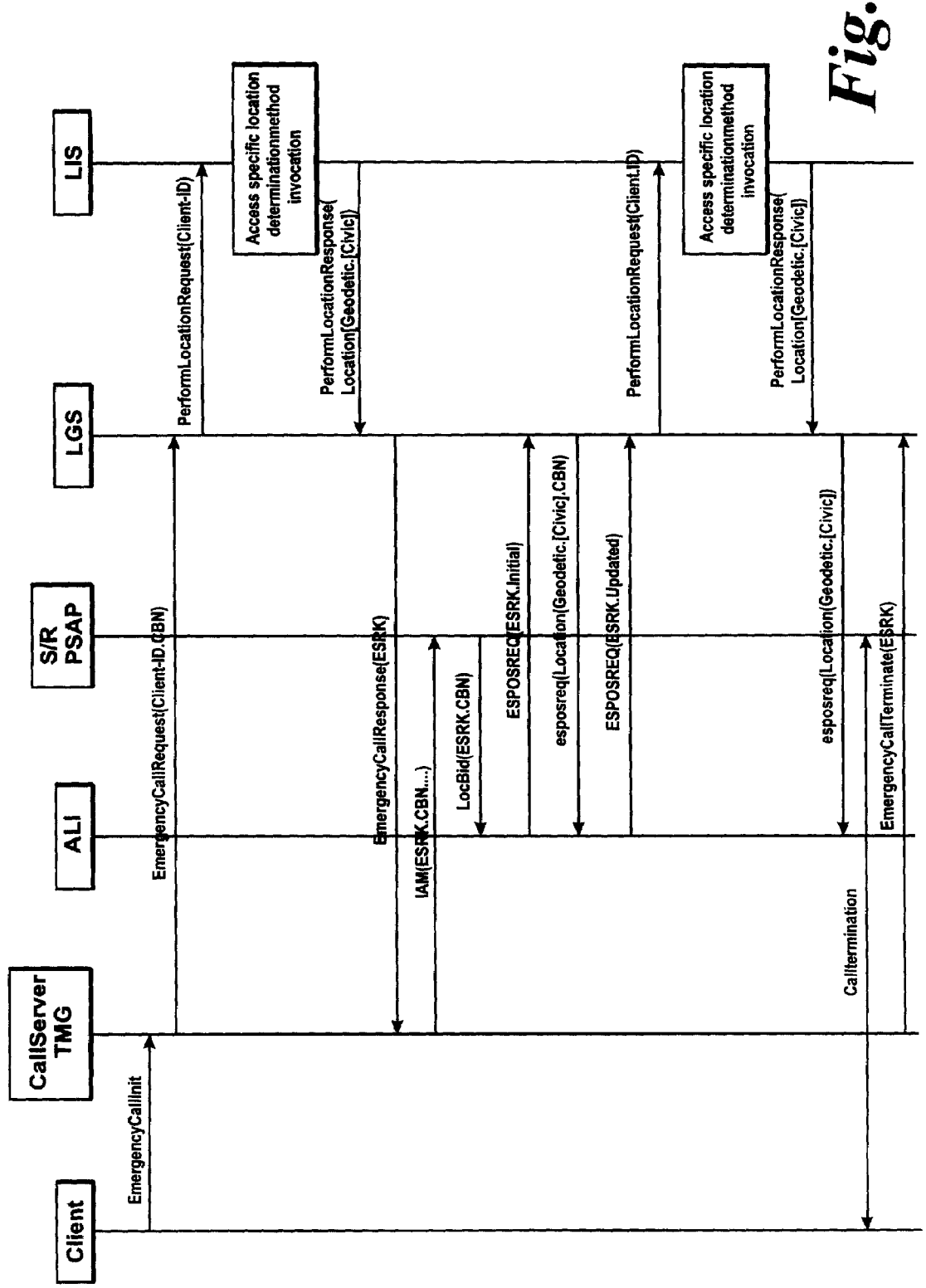
FIG. 8 is a message sequence chart for several embodiments of the invention.

FIG. 8 is a message sequence chart showing a consolidated end to end signaling flow for several of the embodiments described herein. It includes the scenario of a mid-call location update request from the PSAP.

The invention claimed is:

1. A method of providing a routing key for routing an emergency call from a packet-based communications network node to an emergency services network node in a switched telephone network, the packet-based communications network comprising an access part and a core part, said method comprising the steps, performed at a node of the core part of the packet-based communications network, of:
   (i) requesting, during the emergency call, a node in the access part of the packet-based communications network to determine a current geographical location of a terminal from which the emergency call originates;
   (ii) receiving information about the determined current geographical location from the node in the access part of the packet-based communications network;
   (iii) generating a routing key on the basis of the received information and pre-specified information about geographical locations served by particular emergency service network nodes; and
   (iv) storing said generated routing key together with the received information at the node in the core part of the packet-based communications network.

2. A method as claimed in claim 1 wherein said step (ii) further comprises receiving a call-back number from which the emergency call originates.

3. A method as claimed in claim 1 which further comprises providing the stored information to the switched telephone network for receipt by a public safety answering point (PSAP).

4. A method as claimed in claim 3 wherein said stored information is provided via an E2 interface.

5. A computer program stored on a computer readable medium and arranged to control a location gateway server in a packet-based communications network in order to carry out the method of claim 1.

6. A method of routing an incoming emergency call in a packet-based communications network to an appropriate emergency services answering point in a switched telephone network, the packet-based communications network comprising an access part and a core part, said method comprising:
   (I) at a packet-based call server in the core part of the packet-based communications network, receiving the emergency call;
   (ii) requesting a node in the access part of the packet-based communications network to determine a current geographical location of a terminal from which the emergency call originates;
   (iii) at a location gateway server in the core part of the packet-based communications network, receiving information about the determined current geographical location from the node in the access part of the packet-based communications network and using that to generate a routing key;
   (iv) at the call server, routing the emergency call using the generated routing key; and
   (v) storing said generated routing key together with the received information at the location gateway server.

7. A method as claimed in claim 6 wherein said information is received at the location gateway server as a result of polling a location information server in the access part of the packet-based communications network.

8. A method as claimed in claim 6 wherein said packet-based communications network is a voice over internet protocol network.

9. A method as claimed in claim 6 wherein said terminal is a nomadic entity.

10. A method as claimed in claim 6 which further comprises making the stored information accessible to an automatic location identification node in an emergency services network.

* * * * *